(No Model.) 2 Sheets—Sheet 1.
H. C. REAGAN, Jr.
APPLICATION OF SOLAR HEAT TO THERMO BATTERIES.
No. 588,177. Patented Aug. 17, 1897.
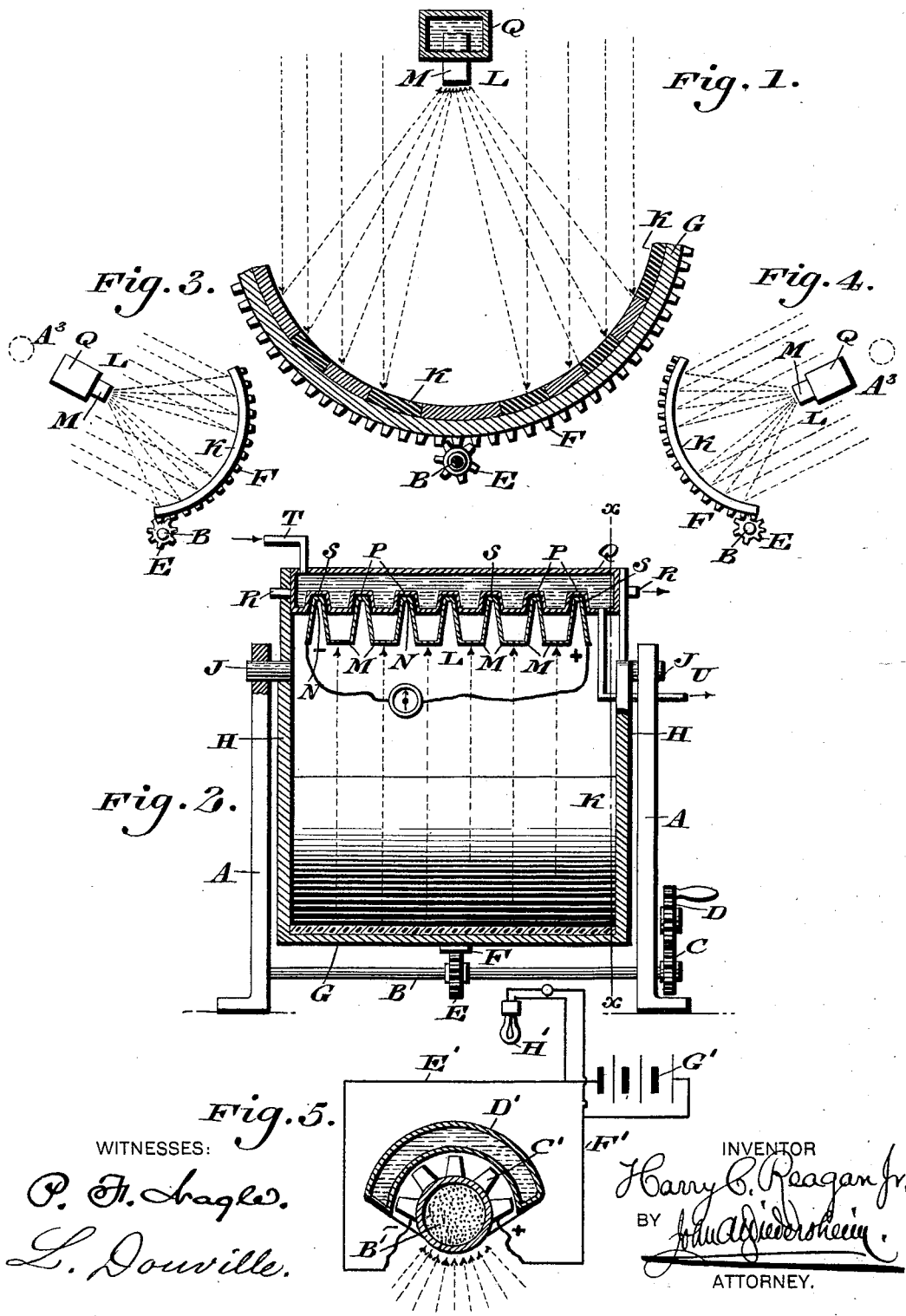

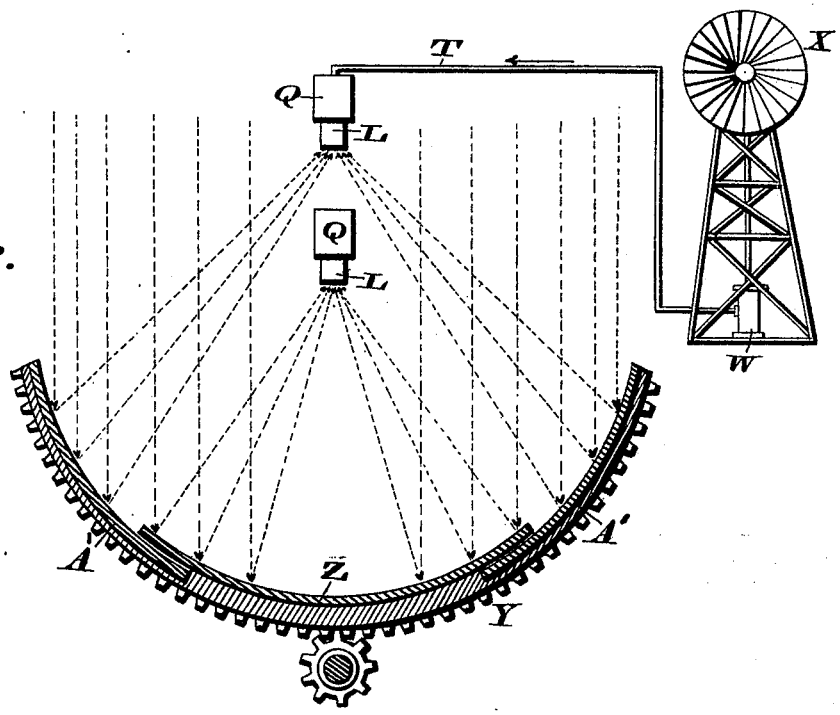

UNITED STATES PATENT OFFICE.

HARRY C. REAGAN, JR., OF PHILADELPHIA, PENNSYLVANIA.

APPLICATION OF SOLAR HEAT TO THERMO-BATTERIES.

SPECIFICATION forming part of Letters Patent No. 588,177, dated August 17, 1897.

Application filed May 15, 1896. Serial No. 591,734. (No model.)

*To all whom it may concern:*

Be it known that I, HARRY C. REAGAN, Jr., a citizen of the United States, residing in the city and county of Philadelphia, State of Pennsylvania, have invented a new and useful Improvement in Application of Solar Heat to Thermo-Batteries, which improvement is fully set forth in the following specification and accompanying drawings.

My invention consists of a novel construction of apparatus in which the sun's rays are utilized for heating thermo-batteries, the object being to concentrate the sun's rays to a focus and have one set of junctions of a thermo-battery at the focus of the rays, while suitable cooling devices are applied to the other junctions of said thermo-battery.

It also consists of making the mirrors which concentrate the sun's rays adjustable in unison with the thermo-batteries.

It also consists of a novel construction in which a double series of reflectors and thermo-couples are employed in conjunction with a windmill to supply the cooling medium.

It further consists of novel details of construction, all as will be hereinafter set forth, and specifically pointed out in the claims.

Figure 1 represents a vertical sectional view of a portion of an apparatus for utilizing and applying the sun's rays to the operation of a series of thermo-couples, the section being taken on line $x$ $x$, Fig. 2, certain of the parts being omitted for clearness of illustration. Fig. 2 represents a vertical sectional view of Fig. 1. Figs. 3 and 4 represent, respectively, side elevations of the apparatus, showing the position the parts may be caused to assume with respect to the sun at different portions of the day, as at morning and evening. Fig. 5 represents a transverse sectional view of a modification in which a suitable heat-retaining device is employed. Fig. 6 represents a side elevation of a modified form of apparatus in which a plurality of mirrors and batteries are employed, a windmill being shown as the preferred device for pumping the cooling medium for said batteries.

Similar letters of reference indicate corresponding parts in the several figures.

Referring to the drawings, A designates uprights or standards which serve to support the principal operative parts of the device.

B designates a rod which is journaled in the lower portion of said uprights, the same having thereon a gear-wheel C, which is adapted to be operated by the gear D.

E designates a pinion which is attached to the shaft B and is adapted to mesh with a curved rack F, which is attached to the bottom G of the frame which carries the mirrors, the same having the upright sides H, to which the trunnions J are attached, which latter have their bearings in the upper portions of the uprights A.

K designates mirrors, which may be slightly curved, as seen in Fig. 1, or, if desired, the same may be made of plane sections, the backing upon which the latter are supported being dark in the latter case if mirror-glass is employed.

L designates the thermo-couples employed, the same having the junctions M, which are adapted to be substantially in the focus of the sun's rays, as indicated in Figs. 1, 3, and 4, when the device is in operation, the other junctions N of said battery L being located contiguous to an adjacent suitable cooling medium, as a tank Q, which has pockets P therein for the reception of said junctions N, suitable non-conducting material S being interposed between said pockets and said junctions N.

R designates trunnions by means of which the cooling-tank Q is journaled in the upper portions of the sides H.

T designates the inlet, and U the outlet, for the water or other cooling medium, which is forced through said tank Q, said pipe T, if desired, leading from the pump W, which may be actuated by a windmill X, as indicated in Fig. 6.

If desired, I may use a plurality of mirrors A' Z, as indicated in Fig. 6, the same being supported upon a suitable backing Y, and a plurality of thermo-couples and cooling devices L and Q, respectively, being employed, as is evident, the rays from the mirror Z being focused upon the lower battery L, while the rays from the mirror A' are to be focused upon the upper battery.

In Fig. 5 I have shown a tank B', which may be made of copper or other suitable conducting material and is to be preferably filled with water or other liquid, the same being located at the focus of the sun's rays, as indicated in Fig. 5, and having mounted thereon the thermo-couples C', one set of whose junctions are contiguous to said tank B', while their other junctions terminate adjacent the receptacle D', in which the cooling fluid may be supplied by any suitable means, a connection being had from the proper poles of the thermo-couples through the connections E' F' to the battery G', other connections being made, if desired, to a lighting device H', as will be evident from Fig. 5, it being evident that, if desired, I may use an empty copper cylinder or receptacle B''.

The whole structure J' is mounted upon trunnions and removable in substantially the same manner as are the cooling devices and thermo-couples Q and L, respectively, it being of course understood that said couples are properly insulated from each other and from the plates K' by means of the material K².

The operation will be apparent from the foregoing, the rays of the sun being concentrated and focused by the proper adjustment of the reflector, so that a maximum degree of heat will be directed on the inner junction of said couples, while the outer junctions are at the same time cooled, as has been described, the electricity generated being taken away and utilized at any convenient point. The mirrors, couples, &c., can be adjusted according to requirements or to the time of the day, so as to suit the condition of the sun, as seen in Figs. 3 and 4, and it will be evident that, if desired, a windmill may be employed to pump the air or other cooling fluid into the tank Q', thus making the operation of the device dependent solely upon the agencies of nature after the apparatus has been once placed in position.

In Fig. 6 the different foci -- ... to the reflectors being of different radii.

Having thus ... scribed my invention, what I claim as new, and desire to secure by Letters Patent, is--

1. In an apparatus for the purpose set forth, a plurality of standards suitably supported, a frame mounted thereon and having a mirror or mirrors secured thereto, in combination with thermo-couples, suitably supported, and having one set of junctions adapted to be heated by the focusing of the sun's rays from said mirrors, and a cooling device at the other set of said junctions.

2. In an apparatus for the purpose set forth, standards, a frame mounted thereon with mirrors on its upper face, thermo-couples having one set of junctions, adapted to be heated by the focusing of the sun's rays from said mirrors, and a cooling device at the other set of said junctions.

3. In an apparatus for the purpose set forth, standards, a partly-cylindrical frame journaled in said standards, mirrors on said frame, a cooling device above said frame having journal-bearings therein, thermo-couples having one set of junctions adapted to be heated by the focusing of the sun's rays from said mirrors, and the other set of junctions adjacent to said cooling-tank and mechanism connected with said frame and standards for adjusting the former.

4. In a thermo-battery, a tank of copper or other suitable conducting material, adapted to be filled with a heat-retaining liquid, a series of thermo-couples supported adjacent to said tank, a cooling device located adjacent to said couples, a mirror adapted to focus the sun's rays upon said tank, means for actuating said mirror, and means for supporting said tank and said cooling device.

5. In an apparatus for the purpose set forth, a frame provided with mirrors on its upper face and suitably supported, and means for oscillating said frame, in combination with thermo-couples, having one set of junctions adapted to be heated by the focusing of the sun's rays from said mirrors, a tank or trough at the other set of said junctions and a windmill adapted to pump a cooling fluid into said trough.

HARRY C. REAGAN, JR.

Witnesses:
JOHN A. WIEDERSHEIM,
E. H. FAIRBANKS.